United States Patent
Nakayasu (10) Patent No.: US 7,392,063 B2
(45) Date of Patent: Jun. 24, 2008

(54) MOBILE COMMUNICATION SYSTEM, RADIO BASE STATION APPARATUS, MOBILE TERMINAL, AND CONTROL METHOD THEREFOR

(75) Inventor: Kanada Nakayasu, Tokyo (JP)

(73) Assignee: NEC Corporation, Tokyo (JP)

( * ) Notice: Subject to any disclaimer, the term of this patent is extended or adjusted under 35 U.S.C. 154(b) by 27 days.

(21) Appl. No.: 11/091,875

(22) Filed: Mar. 29, 2005

(65) Prior Publication Data

US 2005/0221832 A1    Oct. 6, 2005

(30) Foreign Application Priority Data

Mar. 31, 2004    (JP)    ............................. 2004-105859

(51) Int. Cl.
*H04Q 7/20* (2006.01)
(52) U.S. Cl. .................. 455/561; 455/433; 455/428; 370/342; 370/348; 370/335
(58) Field of Classification Search ................ 370/342, 370/348, 335; 455/433, 428, 436, 561
See application file for complete search history.

(56) References Cited

U.S. PATENT DOCUMENTS

| | | | |
|---|---|---|---|
| 6,097,950 A * | 8/2000 | Bertacchi | 455/432.2 |
| 6,337,814 B1 * | 1/2002 | Tanida et al. | 365/189.09 |
| 6,377,814 B1 * | 4/2002 | Bender | 455/522 |
| 7,035,636 B1 * | 4/2006 | Lim et al. | 455/433 |
| 7,035,656 B2 * | 4/2006 | Goldberg | 455/517 |
| 7,092,710 B1 * | 8/2006 | Stoter et al. | 455/437 |
| 2001/0036830 A1 | 11/2001 | Wu et al. | |
| 2002/0193110 A1 * | 12/2002 | Julka et al. | 455/432 |
| 2003/0157935 A1 * | 8/2003 | Kauhanen | 455/436 |
| 2005/0105493 A1 * | 5/2005 | Rai et al. | 370/335 |
| 2005/0197161 A1 * | 9/2005 | Uehara et al. | 455/561 |
| 2006/0209902 A1 * | 9/2006 | Grilli et al. | 370/503 |

FOREIGN PATENT DOCUMENTS

| | | |
|---|---|---|
| EP | 1 094 647 A2 | 4/2001 |
| JP | 2003-47037 A | 2/2003 |
| WO | WO 03/055105 A1 | 7/2003 |

OTHER PUBLICATIONS

3GPP TR25.321 V5.7.0 (Dec. 2003) "MAC protocol specification"—Technical Specification.

* cited by examiner

*Primary Examiner*—William Trost
*Assistant Examiner*—Julio Perez
(74) *Attorney, Agent, or Firm*—Sughrue Mion, PLLC (57) ABSTRACT

A control method for a mobile communication system. The method includes receiving data destined for a mobile terminal from a host apparatus; storing the data in a buffer; keeping the stored data destined for the mobile terminal available even when the mobile terminal changes a cell association; retrieving the data from the buffer; and transmitting the data to the mobile terminal via wireless signals.

44 Claims, 6 Drawing Sheets

MOBILE COMMUNICATION SYSTEM, RADIO BASE STATION APPARATUS, MOBILE TERMINAL, AND CONTROL METHOD THEREFOR

CROSS-REFERENCE TO RELATED APPLICATIONS

This application is based upon and claims the benefit of priority from Japanese patent application No. 2004-105859, filed on Mar. 31, 2004, the disclosure of which is incorporated herein in its entirety by reference.

BACKGROUND OF THE INVENTION

1. Field of Invention

The present invention relates to a mobile communication system, a wireless base station apparatus and mobile terminal provided in the mobile communication system, and a control method therefor.

2. Description of the Related Art

In recent years, the amount of data traffic is expected to greatly increase not only for a fixed radio communication network but also for a mobile radio communication network. Accordingly, HSDPA (High Speed Downlink Packet Access) was proposed in Release 5 of 3GPP (3rd Generation Partnership Project) for W-CDMA (Wideband Code Division Multiple Access), HSDPA enables enlarged data traffic in a downlink circuit (radio link from a wireless base station apparatus to a mobile terminal).

The HSDPA employs HARQ (Hybrid Automatic Repeat reQuest) as an error correction technique. Moreover, according to HSDPA, the downstream data for a number of mobile terminals are multiplexed with respect to time and code into one common channel. For each mobile terminal using the common channel, transmission opportunities are scheduled based on a radio link quality. In a mobile communication system employing HSDPA, the packets are transmitted to a number of mobile terminals under various conditions through the common channel from the wireless base station apparatus, thus, providing an improvement in the system throughput with the larger number of mobile terminals.

In the wireless base station apparatus utilizing the HSDPA as described above, since a spreading encoder provided for each cell is shared in the communication with a plurality of mobile terminals, the transmission signal from the spreading encoder should be allocated among the transmission data sent to the mobile terminals according to priority (degree of priority for transmission opportunity), which is set for each mobile terminal. An example of a wireless base station apparatus enabling the priority control described above is in the 3GPP TR25.321 V5.7.0 (2003-12) "MAC protocol specification", which discloses that a wireless base station apparatus comprises a buffer unit for temporarily holding the user data for each mobile terminal.

Furthermore, in the mobile communication system where mobile terminals establish communications while moving, a buffer control, as well as priority control, is needed in order to securely transmit the user data to the mobile terminal without loss of data. The buffer control is needed even if the mobile terminal changes its associated cell while moving among the cells.

For example, in a mobile communication system where the buffer unit corresponding to each of a plurality of cells managed by the wireless base station apparatus is provided, all user data remaining in the buffer unit corresponding to a certain cell is completely transmitted while the mobile terminal is associated with the certain cell. If the mobile terminal moves to another cell before completing the transmission of the user data because the mobile terminal is moving fast, the transmission of the user data in the buffer unit may not be completed. Conversely, if the communication system immediately changes a buffer unit to store user data based on the changing of a cell association of the mobile terminal, the user data remaining in a previous buffer unit corresponding to a cell previously associated with the mobile terminal is discarded. Accordingly, the discarded user data needs to be retransmitted to the current buffer unit corresponding to a cell currently associated with the mobile terminal.

In order to solve the above-noted problems of related arts and to provide improved communication systems, a first object of the present invention is to provide a base station in which a retransmission of user data destined for a mobile terminal can be suppressed by preventing the user data from being lost due to the changing of cells with which a mobile terminal associates.

BRIEF SUMMARY OF THE INVENTION

A control method and implementing apparatus according to a one aspect of the present invention includes receiving data destined for a mobile terminal from a host apparatus; storing the data in a buffer; keeping the stored data destined for the mobile terminal available even when the mobile terminal changes a cell association; retrieving the data from the buffer; and transmitting the data to the mobile terminal via wireless signals.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF THE INVENTION

According to the present invention, a plurality of cells are assigned to a wireless base station. A mobile terminal associates with one of the plurality of cells in order to communicate with the wireless base station. The wireless base station receives data destined for the mobile terminal from a host apparatus and stores the data in a buffer. The wireless base station keeps the stored data available in the buffer even when the mobile terminal changes a cell association among the plurality of cells. Further, the wireless base station retrieves the data from the buffer and transmits the retrieved data to the mobile terminal. Accordingly, the wireless base station can prevent the data destined for the mobile terminal from being discarded even when the mobile terminal changes the cell association among the plurality of cells.

In addition, according to one aspect of the present invention, the buffer is fixedly associated with the mobile terminal. The buffer stores the data destined for the mobile terminal regardless of which cell the mobile terminal is associated with, so that the wireless base station can keep the data destined for the mobile terminal available even when the mobile terminal changes the cell association among the plurality of cells.

Furthermore, according to another aspect of the present invention, the buffer includes a plurality of cell buffers which are each fixedly associated with a cell among a plurality of cells, respectively. The base station stores the data in a first cell buffer when the mobile terminal is associated with a first cell. Similarly, the base station stores the data in a second cell buffer when the mobile terminal is associated with a second cell. Furthermore, the wireless base station stores the data in both the first cell buffer and the second cell buffer during a transition period of the cell association for the mobile terminal between the first cell and the second cell. Specifically, the wireless base station copies the data to be stored in the cell buffer corresponding to the mobile terminal's previous association to the cell buffer corresponding to the cell to which the mobile terminal is moving to during the transition period and stores the data therein. Accordingly, the wireless base station can keep the data destined for the mobile terminal available even when the mobile terminal changes the cell association among the plurality of cells, and the mobile terminal can receive the data via both of the cells during the transition period.

Exemplary embodiments of the invention will now be described below by reference to the attached Figures. The described exemplary embodiments are intended to assist the understanding of the invention, and are not intended to limit the scope of the invention in any way.

First Exemplary Embodiment

Figure 1:
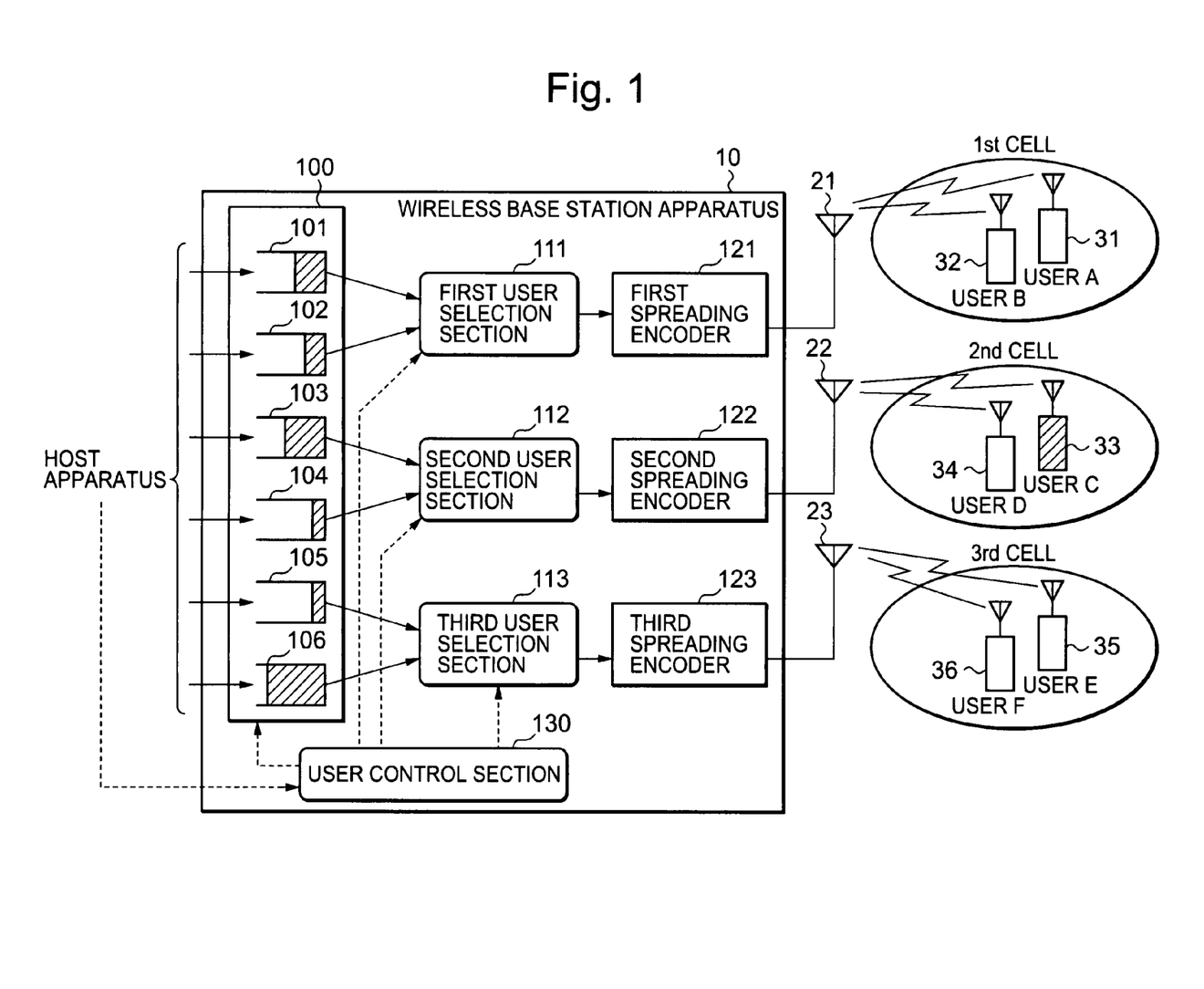
FIG. 1 illustrates a configuration of a mobile communication system according to a first exemplary embodiment of the present invention.

FIG. 1 is a block diagram showing the configuration of a mobile communication system according to a first exemplary embodiment of the invention. As shown in FIG. 1, the mobile communication system comprises the wireless base station apparatus 10, mobile terminals 31 to 36, and a host apparatus (not shown).

The host apparatus may be a Radio Network Controller (RNC) which controls the base station apparatus 10 and transmits data destined for the mobile terminals 31 to 36 to the base station apparatus 10.

In FIG. 1, the mobile terminal 31 and 32 associate with a first cell, the mobile terminal 33 and 34 associate with a second cell, and the mobile terminal 36 and 35 associates with a third cell. The first to third cells are managed by the base station apparatus 10. The number of cells managed by the wireless base station apparatus 10 is not limited to three, and any number of cells may be managed.

The wireless base station apparatus 10 comprises a buffer unit 100, a user control section 130, first to third user selection sections 111 to 113, first to third spreading encoders 121 to 123, and antenna units 21 to 23.

The buffer unit 100 receives data destined for the mobile terminals 31 to 36. The buffer unit 100 comprises a plurality of user buffers (first user buffer 101 to sixth user buffer 106). The user buffers 101 to 106 correspond to the respective mobile terminals 31 to 36, and store the user data destined for each mobile terminal, respectively. For example, the number of user buffers in the buffer unit 100 may be the same number as the number of mobile terminals which may simultaneously be associated with the wireless base station apparatus 10 (i.e. the number of the users buffers may be six (6) in the situation described in FIG. 1). The number of mobile terminals that may simultaneously be associated with the wireless base station apparatus 10 depends on the maximum transmission power.

Each user buffers may be physically separate from each other or may be logically separated from each other and included in one physical memory.

The user selection sections 111, 112 and 113 correspond to the first, second, and third cells, respectively. The user selection sections 111, 112 and 113 select the user data destined for mobile terminal associated with the respective cells and transmit the data to the first spreading encoder 121, the second spreading encoder 122 and the third spreading encoder 123, respectively.

The first spreading encoder 121, the second spreading encoder 122 and the third spreading encoder 123 correspond to the first, second, and third cells, respectively. The spreading encoders 121 to 123 perform an error correcting encoding process for the user data, followed by a well-known spreading process, and output the data to the corresponding antenna units 21 to 23, respectively.

Antenna units 21 to 23 correspond to the first, second and third cells, respectively, and transmit the user data to the respective cells via wireless signals.

The user control section 130 controls the first to third user selection sections 111 to 113. For example, the control section 130 controls the first to third user selection sections in order to achieve a priority control of the user data.

In the first exemplary embodiment, the buffer 100 directly receives the data destined for the mobile terminals 31 to 36. However, a configuration wherein the buffer 100 receives the data destined for the mobile terminal 31 to 36 trough the user control section 130 is also applicable to the invention and within the scope of the invention. Furthermore, any data path from the host apparatus to the buffer 100 is within the scope of the invention.

As described above, the first user selection section 111, the first spreading encoder 121 and the first antenna unit 21 correspond to the first cell among three cells managed by the wireless base station apparatus 10. The second user selection section 112, the second spreading encoder 122 and the second antenna unit 22 correspond to the second cell among three cells managed by the wireless base station apparatus 10. Also, the third user selection section 113, the third spreading encoder 123 and the third antenna unit 23 correspond to the third cell among three cells managed by the wireless base station apparatus 10.

The user control section 130 determines the cell with which each mobile terminal associates based on a signal from the host apparatus, and instructs the user selection sections 111 to 113 to select and retrieve the user data stored in the user buffer.

In the example illustrated in FIG. 1, the first mobile terminal 31 of user A and the second mobile terminal 32 of user B are associated with the first cell, the user data of user A is stored in the first user buffer 101, and the user data of user B is stored in the second user buffer 102.

Also, the third mobile terminal 33 of user C and the fourth mobile terminal 34 of user D are associated with the second cell, the user data of user C is stored in the third user buffer 103, and the user data of user D is stored in the fourth user buffer 104.

Moreover, the fifth mobile terminal 35 of user E and the sixth mobile terminal 36 of user F are associated with the third cell, the user data of user E is stored in the fifth user buffer 105, and the user data of user F is stored in the sixth user buffer 106.

In this example, the user control section 130 instructs the first user selection section 111, which corresponds to the first cell, to select and retrieve the user data stored in the first user buffer 101 and the second user buffer 102, so that a transmission opportunity according to priority may be allocated to the user data, stored in user buffer 101 and 102.

Also, the user control section 130 instructs the second user selection section 112, which corresponds to the second cell, to select the user data stored in the third user buffer 103 and the fourth user buffer 104, so that a transmission opportunity according to priority may be allocated to the user data stored in the user buffer 103 and 104.

Moreover, the user control section 130 instructs the third user selection section 113, which corresponds to the third cell, to select the user data stored in the fifth user buffer 105 and the sixth user buffer 106, so that a transmission opportunity according to the priority may be allocated to the user data stored in the user buffer 105 and 106.

The Weighted Round Robin (hereinafter abbreviated as WRR) method is an example of the priority control used by the user control section 130. The WRR method gives more weight to certain mobile terminals and more transmission opportunity is allocated to the mobile terminal having the greater weight, hence having the higher priority.

The user selection sections 111 to 113 search the corresponding user buffer in accordance with instructions from the user control section 130, retrieve the user data from the searched user buffer, and output the received data to the spreading encoders 121 to 123, respectively.

Figure 2:
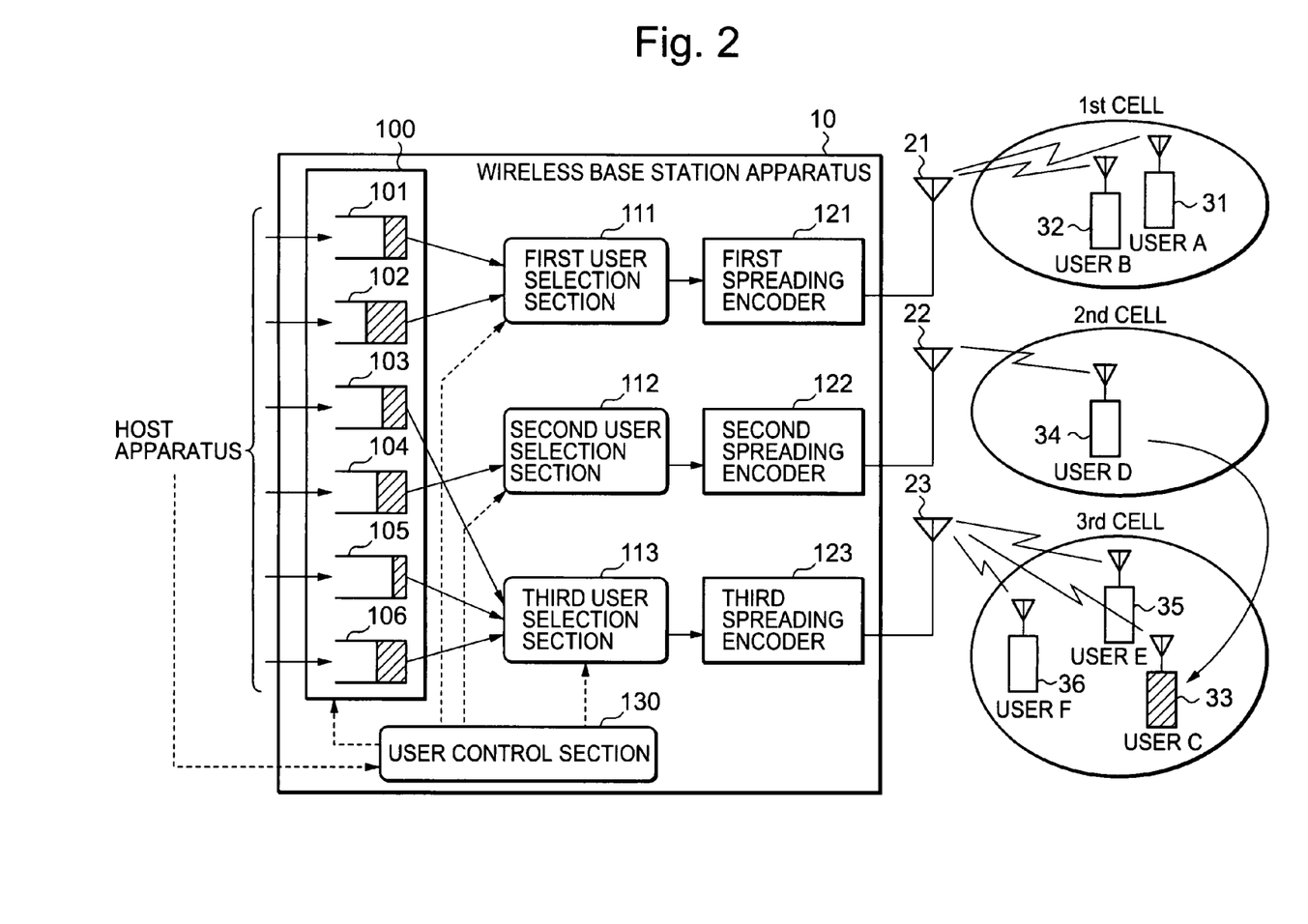
FIG. 2 shows a state where a third mobile terminal of FIG. 1 has moved from a second cell to a third cell.
Figure 3:
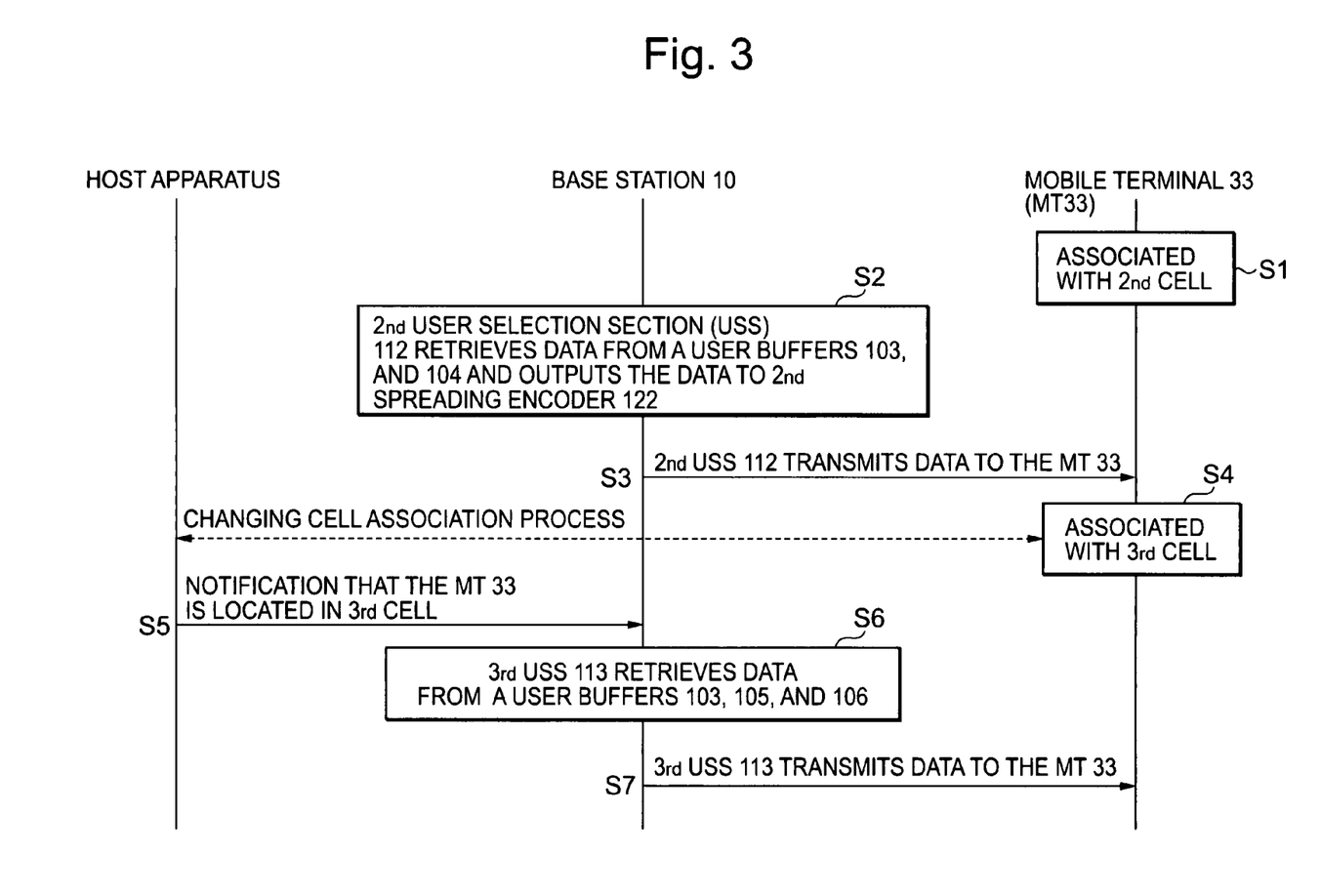
FIG. 3 illustrates a operation of the mobile communication system according to the first exemplary embodiment of the present invention.

Referring to FIGS. 1, 2, and 3, the operation of the mobile communication system according to the first exemplary embodiment will be described below. FIG. 2 is a block diagram showing a state where a third mobile terminal of FIG. 1 has moved from the second cell to the third cell. FIG. 3 shows an operation of the mobile communication system.

As shown in FIG. 1, since the third mobile terminal 33 of user C and the fourth mobile terminal 34 of user D associate with the second cell (S1), the second user selection section 112 retrieves the user data from the third user buffer 103 and the fourth user buffer 104 in accordance with instructions from the user control section 130 so that a transmission opportunity according to priority may be allocated, and outputs the retrieved data to the second spreading encoder 122 (S2). The spreading encoder 122 transmits the data retrieved to the mobile terminals 33 and 34 via the antenna unit 22 (S3).

Also, since the fifth mobile terminal 35 of user E and the sixth mobile terminal 36 of user F associate with the third cell, the third user selection section 113 retrieves the user data from the fifth user buffer 105 and the sixth user buffer 106 in accordance with instructions from the user control section 130 so that a transmission opportunity according to priority may be allocated, and outputs the retrieved data to the third spreading encoder 123. The spreading encoder 123 transmits the data retrieved to the mobile terminals 35 and 36 via the antenna unit 23.

As shown in FIG. 2, when the third mobile terminal 33 of user C has moved from the second cell to the third cell (S4), the user control section 130 detects that the third mobile terminal 33 has moved to the third cell, based on a signal from the host apparatus (S5).

Having detected that the third mobile terminal 33 cell association has changed, the user control section 130 releases the second user selection section 112 from priority control with respect to the user data destined for the third mobile terminal 33 and allows the third user selection section 113 to establish the priority control of the user data destined for the third mobile terminal 33. Further, the user control section 130 may modify the priority setting with respect to the mobile terminals associated with the second cell and the third cell on its own or based on a signal from the host apparatus.

Subsequently, the second user selection section 112 retrieves the user data from the fourth user buffer 104 storing the user data destined for the fourth mobile terminal 34 and outputs the retrieved user data to the second spreading encoder 122 because the fourth mobile terminal 34 of user D is still associated with the second cell.

Also, since the third mobile terminal 33 of user C, the fifth mobile terminal 35 of user E and the sixth mobile terminal 36 of user F associate with the third cell, the third user selection section 113 retrieves the user data from the third user buffer 103, the fifth user buffer 105 and the sixth user buffer 106 in accordance with instructions from the user control section 130 (S6) so that a transmission opportunity according to priority may be allocated, and outputs the retrieved data to the third spreading encoder 123. The spreading encoder 123 transmits the received data to the mobile terminals 33, 35 and 36 via the antenna unit 23 (S7).

With the wireless base station apparatus of the first exemplary embodiment, each user data destined for each of mobile terminals associates with a plurality of cells are selected and retrieved from each user buffer, and transmitted to each mobile terminal with a priority control for each cell. Therefore, even when a cell association changes for a mobile terminal due to the movement of the user, the user data is transmitted to each mobile terminal without discarding the user data remaining within the buffer unit 100. Accordingly, a discard process for the user data and a retransmission of the user data are unnecessary, resulting in greater communication efficiency between the wireless base station apparatus 10 and each mobile terminal.

Second Exemplary Embodiment

The first exemplary embodiment describes an example in which the buffer unit is shared among all the cells. A wireless base station apparatus according to a second exemplary embodiment has a buffer unit corresponding to each cell, each buffer unit being managed cell by cell.

Figure 4:
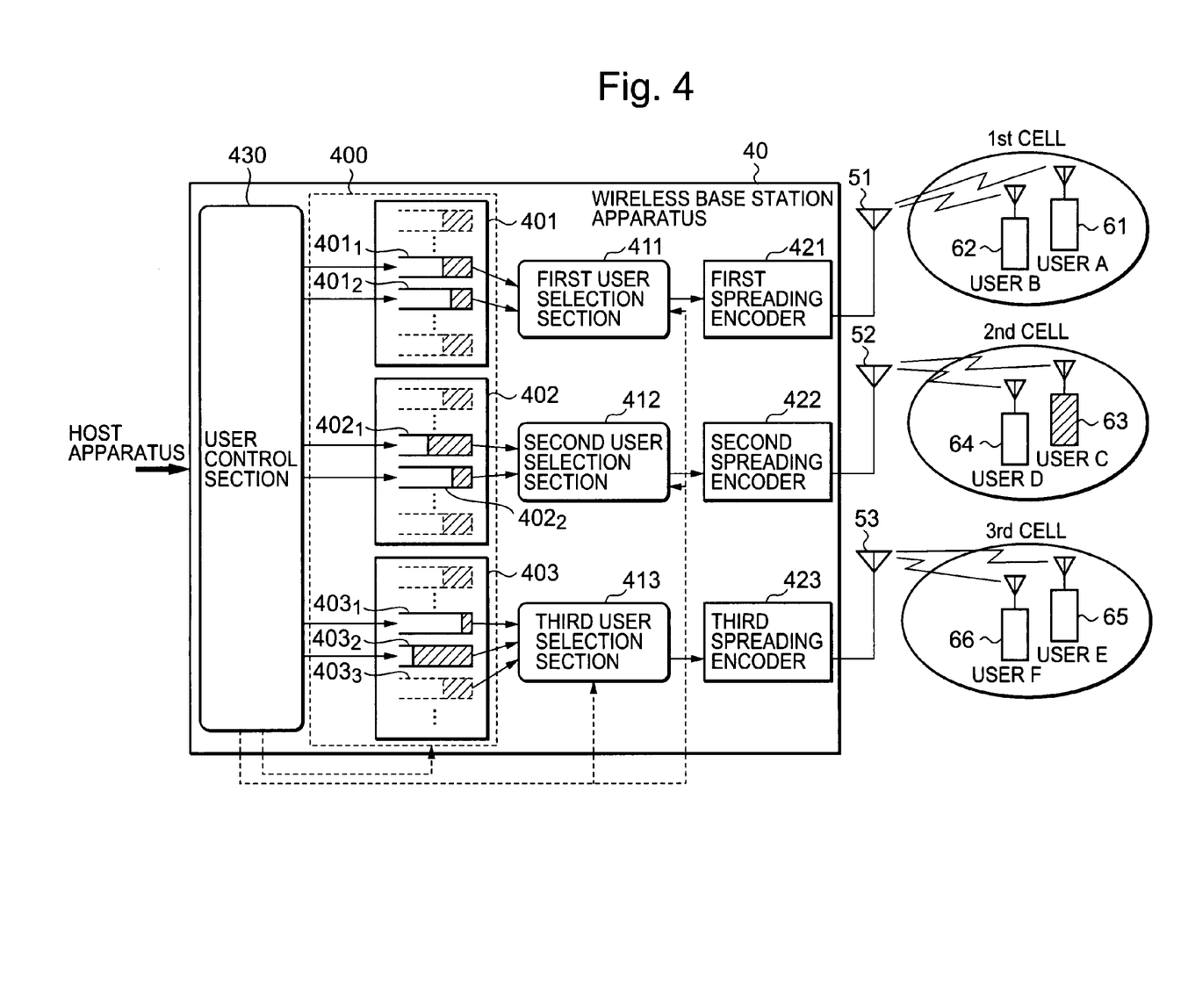
FIG. 4 is illustrates a configuration of a mobile communication system according to a second exemplary embodiment of the invention.

FIG. 4 is a block diagram showing the configuration of a mobile communication system according to the second exemplary embodiment of the invention. As shown in FIG. 4, the mobile communication system comprises the wireless base station apparatus 40, mobile terminals 61 to 66, and a host apparatus (not shown).

The host apparatus may be a Radio Network Controller (RNC) which controls the base station apparatus 40 and transmits data destined for the mobile terminals 61 to 66 to the base station apparatus 40.

In FIG. 4, the mobile terminals 61 and 62 associate with a first cell, the mobile terminals 63 and 64 associate with a second cell, and the mobile terminals 65 and 66 associate with a third cell. The first to third cells are managed by the base station 40. The number of cells managed by the wireless base station apparatus 40 is not limited to three, and any number of cells can be managed.

The wireless base station apparatus 40 comprises a buffer unit 400, a user control section 430, first to third user selection sections 411 to 413, first to third spreading encoders 421 to 423, and antenna units 51 to 53.

The buffer unit 400 comprises first to third cell buffers 401 to 403. The first to third cell buffers 401 to 403 correspond to the first to third cells, respectively, and store user data destined for mobile terminals associating with the respective cells. The first to third cell buffers 401 to 403 comprise a plurality of user buffers (401-1, 401-2, 402-1, 402-2, 403-1 and 403-2). The user buffers 401-1, 401-2, 402-1, 402-2, 403-1 and 403-2, correspond to the respective mobile terminals 61 to 66, and store the user data destined for each mobile terminal, respectively. Each of cell buffers 401 to 403 has certain number of user buffers so that the mobile terminals associated with each cell can be assigned to the respective user buffers. For example, the number of the user buffer in each cell buffer may be the same number as the number of the mobile terminals which may simultaneously be associated with the base station 40 (i.e. the number of the user buffers in each cell buffer may be six (6) in the situation described in FIG. 4). The number of mobile terminals that may simultaneously be associated with the wireless base station apparatus 40 depends on the maximum transmission power.

The cell buffers may be physically separate from each other or may be logically separated from each other and included in one physical memory. The each user buffers also may be physically separate from each other or may be logically separated from each other and included in one physical memory.

The user selection section 411, 412 and 413 correspond to the first, second, and third cells, respectively. The user selection section 411, 412 and 413 select the user data destined for the mobile terminal associated with each cell and transmit the data to the first spreading encoder 421, the second spreading encoder 422 and the third spreading encoder 423, respectively.

The first spreading encoder 421, the second spreading encoder 422 and the third spreading encoder 423 correspond to the first, second, and third cells, respectively. The spreading encoders 421 to 423 perform an error correcting encoding process for the user data, followed by a well-known spreading process, and output the user data to antenna units 51 to 53, respectively.

Antenna units 51 to 53 correspond to the first, second and third cells, respectively, and transmit the data to the respective cells via wireless signals.

The user control section 430 controls the first to third user selection sections 411 to 413. For example, the user control section 430 detects the cell association for each mobile terminal based on a signal from the host apparatus, and stores the user data destined for each mobile terminal in the user buffer of the corresponding cell buffer units 401, 402, and 403. Also, the user control section 430 instructs the first user selection section 411 to the third user selection section 413 to select and retrieve the user data stored in the user buffer of the corresponding cell buffer units 401, 402, and 403.

In the second exemplary embodiment, the buffer unit 400 receives the data destined for the mobile terminals 61 to 66 through the user control section 430. However, a configuration wherein the buffer unit 400 directly receives the data destined for the mobile terminal 61 to 66 from the host apparatus is also applicable to the invention and within a scope of the invention. Furthermore, any data path from the host apparatus to the buffer unit 400 is with in the scope of the invention.

As described above, in the example illustrated in FIG. 4, the first mobile terminal 61 of user A and the second mobile terminal 62 of user B are associated with the first cell, in which the user data of user A is stored in the first user buffer 401-1, and the user data of user B is stored in the second user buffer 401-2.

Also, the third mobile terminal 63 of user C and the fourth mobile terminal 64 of user D are associated with the second cell, in which the user data of user C is stored in the third user buffer 402-1, and the user data of user D is stored in the fourth user buffer 402-2.

Moreover, the fifth mobile terminal 65 of user E and the sixth mobile terminal 66 of user F are associated with the third cell, in which the user data of user E is stored in the fifth user buffer 403-1, and the user data of user F is stored in the sixth user buffer 403-2.

In this example, the user control section 430 instructs the first user selection section 411, which corresponds to the first cell, to select and retrieve the user data stored in the first user buffer 401-1 and the second user buffer 402-2, so that a transmission opportunity according to priority may be allocated to the user data stored in the user buffers 401-1 and 401-2.

Also, the user control section 430 instructs the second user selection section 412, which is corresponds to the second cell, to select the user data stored in the third user buffer 402-1 and the fourth user buffer 402-2, so that a transmission opportunity according to the priority may be allocated to the user data stored in the use buffers 402-1 and 402-2.

Moreover, the user control section 430 instructs the third user selection section 413 associated to the third cell, to select the user data stored in the fifth user buffer 403-1 and the sixth user buffer 403-2, so that a transmission opportunity according to the priority may be allocated to the user data stored in the user buffers 403-1 and 403-2.

Similar to the first exemplary embodiment, the WRR method is an example of priority control.

The user selection sections 411 to 413 search a corresponding user buffer from the first cell buffer unit 401 to the third buffer unit 403 according to instructions from the user control section 430, retrieve the user data from the searched user buffer, and output the retrieved data to the corresponding spreading encoders 421 to 423.

Figure 5:
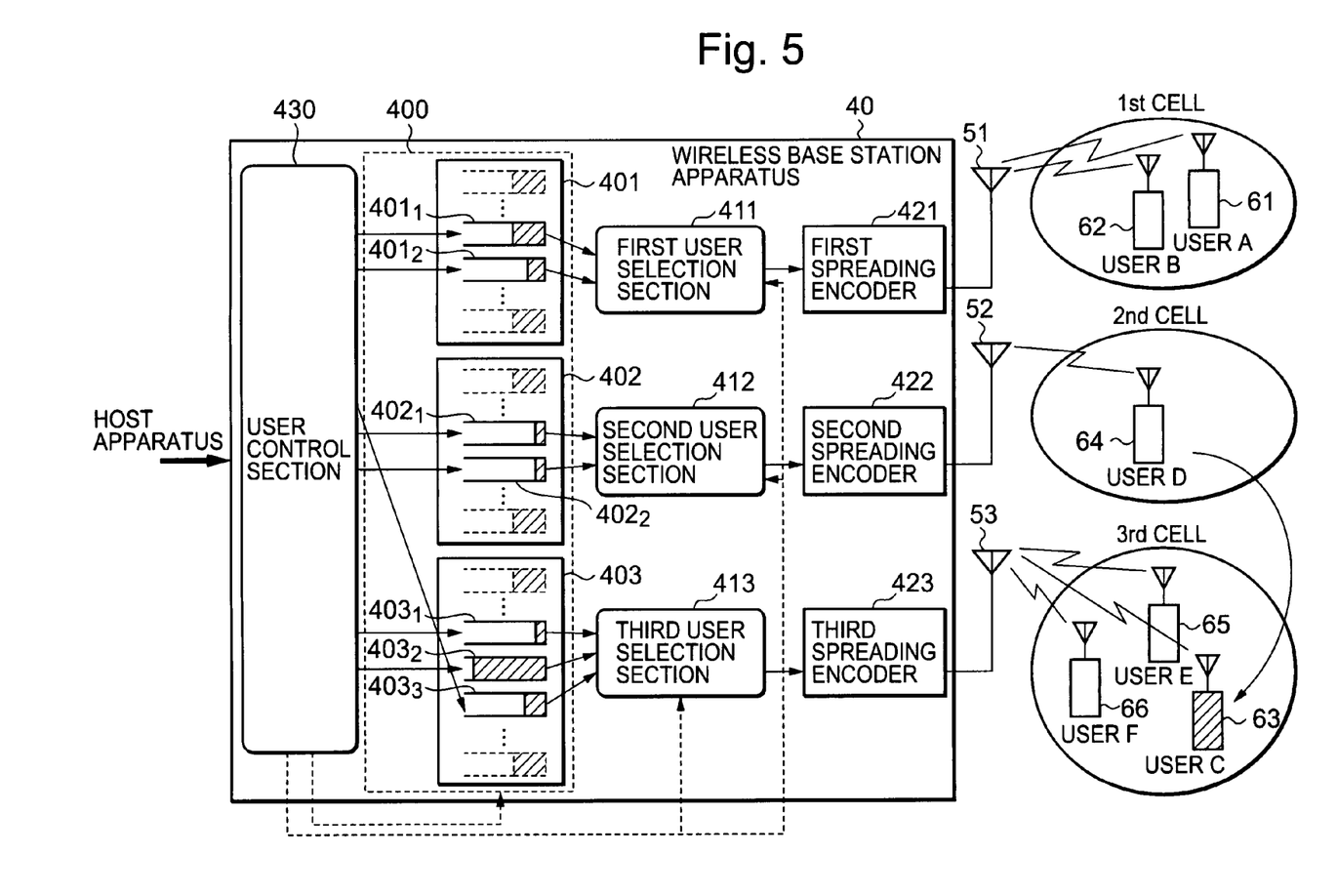
FIG. 5 is illustrates a state where a third mobile terminal of FIG. 4 has moved from a second cell to a third cell.
Figure 6:
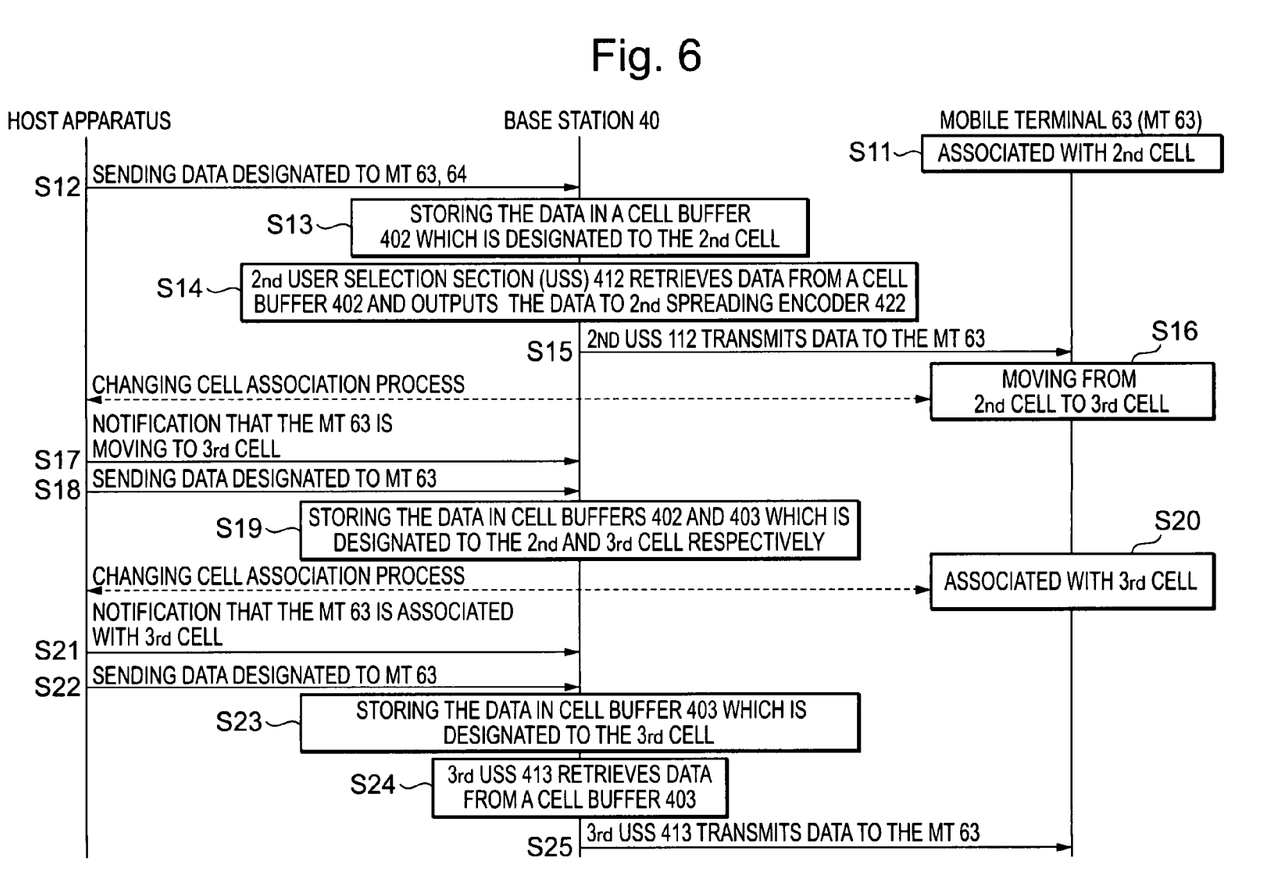
FIG. 6 illustrates a operation of the mobile communication system according to the second exemplary embodiment of the present invention.

Referring to FIGS. 4, 5, and 6, an operation of the mobile communication system according to the second exemplary embodiment will be described below. FIG. 5 is a block diagram showing a state where a third mobile terminal of FIG. 4 has moved from the second cell to the third cell. FIG. 6 shows a operation of the mobile communication system according to the second exemplary embodiment.

As shown in FIG. 3, since the third mobile terminal 63 of user C and the fourth mobile terminal 64 of user D are associated with the second cell (S11), the user data of user C and the user data of user D sent from the host apparatus are stored in the fourth user buffer 402-2 and 402-2, respectively (S12, S13). The second user selection section 412 retrieves the user data from the third user buffer 402-1 and the fourth user buffer 402-2 in accordance with instructions from the user control section 430 so that a transmission opportunity according to the priority may be allocated, and outputs the retrieved data to the second spreading encoder 422 (S14). The spreading encoder 422 transmits the data retrieved to the mobile terminals 63 and 64 via the antenna unit 52 (S15).

Also, since the fifth mobile terminal 65 of user E and the sixth mobile terminal 66 of user F are associated with the third cell, the third user selection section 413 retrieves the user data from the fifth user buffer 403-1 and the sixth user buffer 403-2 in accordance with instructions from the user control section 430 so that a transmission opportunity according to the priority may be allocated, and outputs the retrieved data to the third spreading encoder 423.

As shown in FIG. 5, when the third mobile terminal 63 of user C has moved from the second cell to the third cell (S16), the user control section 430 detects that the third mobile terminal 63 has moved to the third cell, based on a signal from the host apparatus (S17).

Having detected that the cell association of the third mobile terminal 63 is changing, the user control section 430 assigns a seventh user buffer 403-3 in the third buffer unit 403 to the third mobile terminal 63 for storing the user data destined for the third mobile terminal 63 and currently sent to the third user buffer 402-1, and transfers a copy of the user data destined for the third mobile terminal 63 to the seventh user buffer 403-3 (i.e., the user data destined for the third mobile terminal 63 is stored in both user buffer 402-1 and user buffer 403-3) (S18, S19).

Successively, the user control section 430 deletes the contents of the third user buffer 402-1 and stops storing the user data destined for the third mobile terminal 63 in the second buffer unit 402 when the third mobile terminal 63 has completed moving to the third cell and has associated with the third cell. The user control section 430 detects that the third mobile terminal 63 has associated with the third cell based on a signal from the host apparatus (S20, S21, S22, S23). Further, the user control section 430 may modify the priority setting with respect to the mobile terminals associated with the second cell and the third cell on its own or based on a signal from the host apparatus.

Subsequently, the second user selection section 412 retrieves the user data from the fourth user buffer 402-2 storing the user data destined for the fourth mobile terminal 64 and outputs the retrieved user data to the second spreading encoder 422 because the fourth mobile terminal 64 of user D is still associated with the second cell.

Also, since the third mobile terminal 63 of user C, the fifth mobile terminal 65 of user E and the sixth mobile terminal 66 of user F are associated with the third cell, the third user selection section 413 retrieves the user data from the fifth user buffer 403-1, the sixth user buffer 403-2 and the seventh user buffer 403-3 in accordance with instructions from the user control section 430 so that a transmission opportunity according to priority may be allocated, and outputs the retrieved data to the third spreading encoder 423 (S23). The spreading encoder 423 transmits the data retrieved to the mobile terminals 63, 65 and 64 via the antenna unit 53 (S25).

With the wireless base station apparatus of the second embodiment, like the first embodiment, the user data is transmitted to each mobile terminal without discarding the user data remaining in the appropriate buffer unit. Accordingly, a discard process for the user data and a retransmission of the user data are unnecessary, resulting in greater communication efficiency between the wireless base station apparatus 40 and each mobile terminal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the following claims.

What is claimed:

1. A wireless base station which manages a plurality of cells, comprising:
    a buffer means for receiving data destined for a mobile terminal from a host apparatus, for storing the data, and for keeping the data destined for the mobile terminal available even when the mobile terminal changes a cell association between a first cell and a second cell of the plurality of cells;
    a first transmitting means, coupled to the buffer means and associated with the first cell assigned to said wireless base station, for retrieving the data from the buffer means and for transmitting the data to the mobile terminal via wireless signals when the mobile terminal associates with the first cell; and
    a second transmitting means, coupled to the buffer means and associated with the second cell assigned to said wireless base station, for retrieving the data from the buffer means and for transmitting the data to the mobile terminal via wireless signals when the mobile terminal associates with the second cell,
    wherein the buffer means comprises:
    first cell buffer means, fixedly associated with the first cell, for storing the data when the mobile terminal associates with the first cell assigned to the wireless base station; and
    second cell buffer means, fixedly associated with the second cell, for storing the data when the mobile terminal associates with the second cell assigned to the wireless base station,
    wherein the first transmitting means retrieves the data from the first cell buffer means and transmits the data to the mobile terminal via wireless signals when the mobile terminal associates with the first cell,
    the second transmitting means retrieves the data from the second cell buffer means and transmits the data to the mobile terminal via wireless signals when the mobile terminal associates with the second cell, and both of the first cell buffer means and the second cell buffer means store the data during a transition period of the cell association for the mobile terminal between the first cell and the second cell.

2. The wireless base station according to claim 1, wherein the buffer means is fixedly assigned to the mobile terminal regardless of which cell the mobile terminal is associated with.

3. The wireless base station according to claim 2, wherein at least one of the first transmitting means and the second transmitting means sets priority for the mobile terminal wherein a number of transmission opportunities to the mobile terminal is based on the priority.

4. The wireless base station according to claim 3, wherein the priority is determined by Weighted Round Robin method.

5. The wireless base station according to claim 3, wherein the priority is determined based on a radio link quality for the mobile terminal.

6. The wireless base station according to claim 2, wherein the first transmitting means and the second transmitting means receive a notification of a cell association for the mobile terminal from the host apparatus.

7. The wireless base station according to claim 2, wherein at least one of the first transmitting means and the second transmitting means encodes the data for an error correction process, spreads the encoded data, and transmits the spread data to the mobile terminal.

8. The wireless base station according to claim 1, wherein the first cell buffer means stops storing the data after the mobile terminal completes the transition of the cell association and associates with the second cell.

9. The wireless base station according to claim 1, wherein at least one of the first transmitting means and the second transmitting means sets priority for the mobile terminal, wherein a number of transmission opportunities to the mobile terminal is based on the priority.

10. The wireless base station according to claim 9, wherein the priority is determined by means of Weighted Round Robin method.

11. The wireless base station according to claim 9, wherein the priority is determined based on a radio link quality for the mobile terminal.

12. The wireless base station according to claim 1, wherein the first cell buffer means and the second cell buffer means receive a notification of the cell association for the mobile terminal from the host apparatus.

13. The wireless base station according to claim 1, wherein at least one of the first transmitting means and the second transmitting means encodes the data for an error correction process, spreads the encoded data, and transmits the spread data to the mobile terminal.

14. A mobile communication system, comprising:
   terminal means for associating with at least one of a first cell and a second cell, and for changing a cell association for the terminal means, between the first cell and the second cell, and for receiving data destined for the terminal means, and
   a wireless base station which manages a plurality of cells comprising:
   buffer means for receiving data destined for a mobile terminal from a host apparatus, for storing the data, and for keeping the data destined for the mobile terminal available even when the mobile terminal changes a cell association between said first cell and said second cell of the plurality of cells;
   first transmitting means, coupled to the buffer means and associated with the first cell, for retrieving the data from the buffer means and for transmitting the data to the mobile terminal via wireless signals when the mobile terminal associates with the first cell; and
   second transmitting means, coupled to the buffer means and associated with the second cell, for retrieving the data from the buffer means and for transmitting the data to the mobile terminal via wireless signals when the mobile terminal associates with the second cell,
   wherein the first cell and the second cell are assigned to the wireless base station,
   wherein the buffer means comprises,
   first cell buffer means, fixedly associated with the first cell, for storing the data when the mobile terminal associates with the first cell assigned to the wireless base station; and
   second cell buffer means, fixedly associated with the second cell, for storing the data when the mobile terminal associates with the second cell assigned to the wireless base station,
   wherein the first transmitting means retrieves the data from the first cell buffer means and transmits the data to the mobile terminal via wireless signals when the mobile terminal associates with the first cell,
   the second transmitting means retrieves the data from the second cell buffer means and transmits the data to the mobile terminal via wireless signals when the mobile terminal associates with the second cell, and
   both of the first cell buffer means and the second cell buffer means store the data during a transition period of the cell association for the mobile terminal between the first cell and the second cell.

15. The mobile communication system according to claim 14, wherein the buffer is fixedly assigned to the mobile terminal regardless of which cell the mobile terminal is associated with.

16. The mobile communication system according to claim 15, further comprising the host means for transmitting the data destined for the terminal means to the base station.

17. The mobile communication system according to claim 15, wherein the first transmitting means and second transmitting means receives a notification of the cell association for the terminal means from the host means.

18. The mobile communication system according to claim 15, wherein at least one of the first transmitting means and the second transmitting means sets priority for the terminal means wherein the number of transmission opportunities to the mobile terminal is based on the priority.

19. The mobile communication system according to claim 18, wherein the priority is determined by means of Weighted Round Robin method.

20. The mobile communication system according to claim 18, wherein the priority is determined based on a radio link quality for the mobile terminal.

21. The mobile communication system according to claim 15, wherein at least one of the first transmitting means and the second transmitting means encodes the data for an error correction process, spreads the encoded data, and transmits the spread data to the terminal means.

22. The mobile communication system according to claim 14, wherein the first cell buffer means stops storing the data after the terminal means completes the transition in the cell association and associates with the second cell.

23. The mobile communication system according to claim 14, further comprising the host means for transmitting the data destined for the terminal means to the base station.

24. The mobile communication system according to claim 14, wherein the first cell buffer means and the second cell buffer means receives a notification of the cell association from the host means.

25. The mobile communication system according to claim 14, wherein at least one of the first transmitting means and the second transmitting means sets plurality for the terminal means wherein the number of transmission opportunities to the mobile terminal is based on the priority.

26. The mobile communication system according to claim 25, wherein the priority is determined by means of Weighted Round Robin method.

27. The mobile communication system according to claim 25, wherein the priority is determined based on a radio link quality for the mobile terminal.

28. The mobile communication system according to claim 14, wherein at least one of the first transmission means and the second transmitting means encodes the data for an error correction process, spreads the encoded data, and transmits the spread data to the terminal means.

29. A wireless base station which manages a plurality of cells, comprising:
   a buffer memory which receives data destined for a mobile terminal from a host apparatus, stores the data, and keeps the data destined for the mobile terminal available even when the mobile terminal changes a cell association between a first cell and a second cell of the plurality of cells;
   a first transmitter, coupled to the buffer memory and associated with the first cell assigned to said wireless base station, which retrieves the data from the buffer memory and transmits the data to the mobile terminal via wireless signals when the mobile terminal associates with the first cell designated to the wireless base station; and a second transmitter, coupled to the buffer memory and associated with the second cell assigned to said wireless base station, which retrieves the data from the buffer memory and transmits the data to the mobile terminal via wireless signals when the mobile terminal associates with the second cell designated to the wireless base station, wherein the buffer memory comprises, first cell buffer, fixedly associated with the first cell, which stores the data when the mobile terminal associates with the first cell assigned to the wireless base station; and second cell buffer, fixedly associated with the second cell, which stores the data when the mobile terminal associates with the second cell assigned to the wireless base station, wherein the first transmitter retrieves the data from the first cell buffer and transmits the data to the mobile terminal via wireless signals when the mobile terminal associates with the first cell, the second transmitter retrieves the data from the second cell buffer and transmits the data to the mobile terminal via wireless signals when the mobile terminal associates with the second cell, and both of the first cell buffer and the second cell buffer store the data during a transition period of the cell association for the mobile terminal between the first cell and the second cell.

30. The wireless base station according to claim 29, wherein the buffer memory is fixedly assigned to the mobile terminal regardless of which cell the mobile terminal is associated with.

31. The wireless base station according to claim 29, wherein the first cell buffer stops storing the data after the mobile terminal completes the transition of the cell association and associates with the second cell.

32. A control method, comprising:
receiving data destined for a mobile terminal from a host apparatus;
storing the data in a buffer;
keeping the stored data destined for the mobile terminal available even when the mobile terminal changes a cell association between a first cell and a second cell of a plurality of cells managed by a base station;
retrieving the data from the buffer; and
transmitting the data to the mobile terminal via wireless signals,
wherein, the buffer comprises a first cell buffer fixedly associated with the first cell, and a second cell buffer fixedly associated with the second cell, wherein the storing the data in the buffer comprises:
storing the data in the first cell buffer when the mobile terminal associates with the first;
storing the data in the second cell buffer when the mobile terminal associates with the second cell; and
storing the data in both the first cell buffer and the second cell buffer during a transition period of the cell association for the mobile terminal between the first cell and the second cell, and the retrieving the data from the buffer comprises:
retrieving the data from the first cell buffer when the mobile terminal associates with the first cell; and
retrieving the data from the second cell buffer when the mobile terminal associates with the second cell.

33. The control method according to claim 32, wherein the buffer is fixedly assigned to the mobile terminal regardless of which cell the mobile terminal is associated with.

34. The control method according to claim 33, further comprising:
setting priority for the mobile terminal, wherein a number of transmission opportunities to the mobile terminal is based on the priority.

35. The control method according to claim 34, wherein the priority is determined by means of Weighted Round Robin method.

36. The control method according to claim 34, wherein the priority is determined based on a radio link quality for the mobile terminal.

37. The control method according to claim 33, further comprising:
receiving a notification of the cell association for the first mobile terminal from the host apparatus.

38. The control method according to claim 33, further comprising:
encoding the data for an error correction process; and
spreading the encoded data,
wherein the data is transmitted to the mobiles terminal after encoding and spreading.

39. The control method according to claim 32, further comprising: stopping a process of storing the data in the first cell buffer after the mobile terminal completes the transition of the cell association and associates with the second cell.

40. The control method according to claim 32, further comprising:
setting priority for the mobile terminals, wherein a number of transmission opportunities to the mobile terminal is based on the priority.

41. The control method according to claim 40, wherein the priority is determined by Weighted Round Robin method.

42. The control method according to claim 40, wherein the priority is determined based on a radio link quality for the mobile terminal.

43. The control method according to claim 32, further comprising: receiving a notification of the cell association for the mobile terminal from the host apparatus.

44. The control method according to claim 32, further comprising:
encoding the data for an error correction process; and
spreading the encoded data,
wherein the data is transmitted to the mobiles terminal after encoding and spreading.

* * * * *